UNITED STATES PATENT OFFICE.

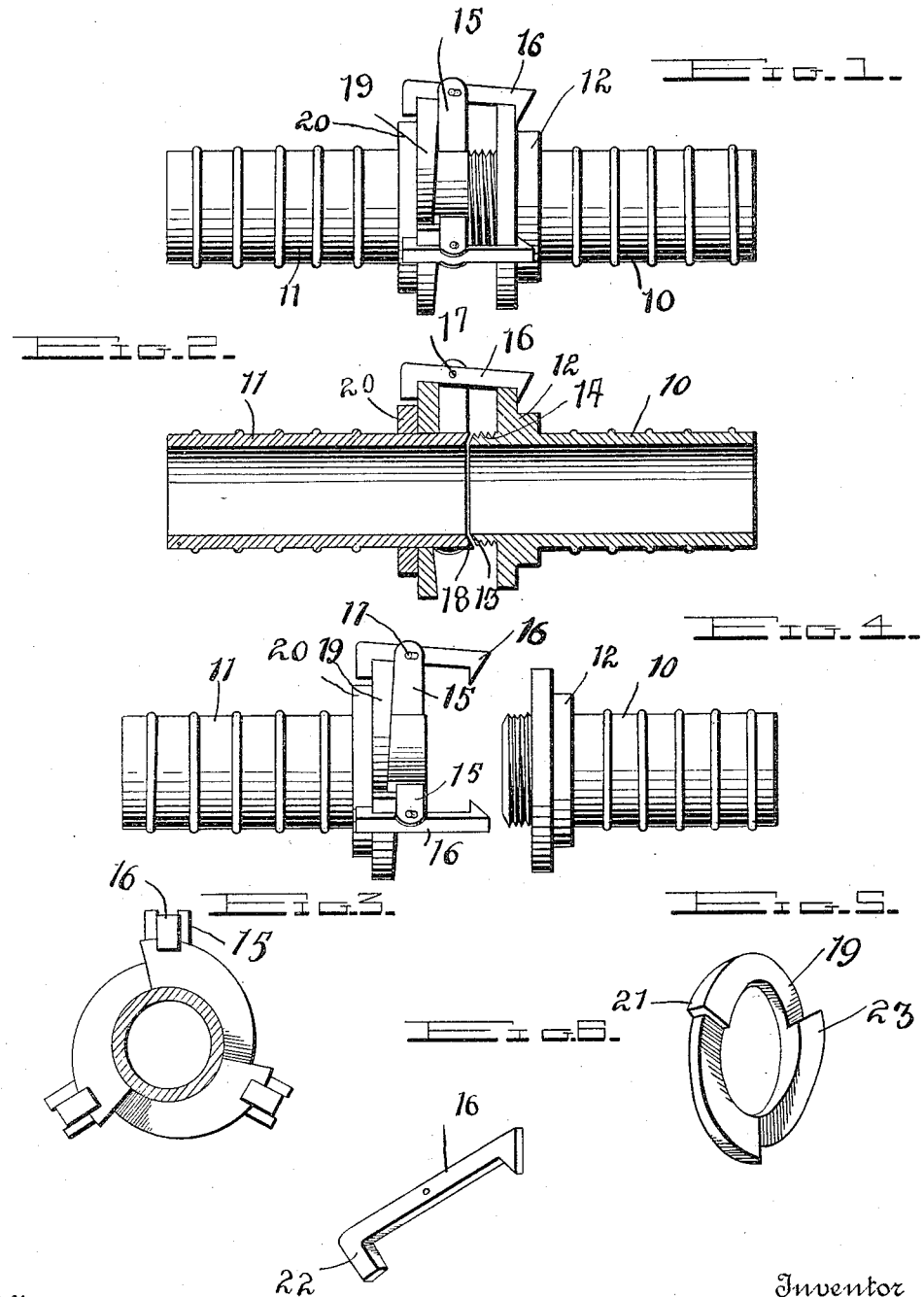

WILLIAM E. SANDERS, OF BROWNVILLE, NEW YORK.

FIRE-HOSE CONNECTION.

1,069,904.   Specification of Letters Patent.   Patented Aug. 12, 1913.

Application filed February 6, 1913.   Serial No. 746,623.

*To all whom it may concern:*

Be it known that I, WILLIAM E. SANDERS, a citizen of the United States, residing at Brownville, in the county of Jefferson, State of New York, have invented certain new and useful Improvements in Fire-Hose Connections; and I do hereby declare the following to be a full, clear, and exact description of the invention, such as will enable others skilled in the art to which it appertains to make and use the same.

This invention relates to hose couplings and has for an object to provide a device of this character in which by simply manually rotating a cam ring the mating sections of the coupling may be joined or disconnected to couple or uncouple lengths of hose together in a minimum time.

A further object is to provide an extremely simple and inexpensive hose coupling that may be formed of a few durable parts that will not easily get out of order.

With the above objects in view the invention consists of certain novel details of construction and combination of parts hereinafter fully described and claimed, it being understood that various modifications may be made in the minor details of construction within the scope of the appended claim.

In the accompanying drawing illustrating this invention:—Figure 1 is a side elevation. Fig. 2 is a longitudinal section. Fig. 3 is a cross sectional view showing the facial cam projections of the ring. Fig. 4 is a side elevation showing the coupling disconnected. Fig. 5 is a detail perspective view of the ring. Fig. 6 is a detail perspective view of one of the clutch hooks.

Referring now to the drawing in which like characters of reference designate similar parts, 10 and 11 designate tubular members to which the ends of sections of hose are applied. The member 10 is equipped with a circumferential stepped collar 12 and is further formed with a beveled end 13, there being screw threads 14 between the collar and end to facilitate applying the member to a hydrant if desired. The member 11 is provided with a circumferential series of hinge lugs 15 which are spaced at equal distances apart on the member and are each bifurcated to receive the intermediate portion of a clutch hook 16, a pivot pin 17 being passed through the hook and lug to pivotally secure the hook. The hook is terminally adapted to engage over the stepped collar 12 of the member 10 and couple the member 10 to the member 11. There is a bevel end 18 formed on the member 11 to engage with the mating beveled end 13 of the member 10 when the members are coupled together and form a tight joint.

For moving the clutch hooks to operative and released position I provide a cam ring 19 which is revolubly mounted on the member 11 between the lugs 15 and an abutment collar 20 on the member. The ring is provided peripherally with a series of three cam projections 21 corresponding to the three hooks and fitting respectively in angular notches 22 formed in the lower edges of the hooks. When the ring is manually turned to the right the rear ends of the hooks ride up on these cam projections with a resultant lowering of the forward ends of the hooks into engagement with the stepped collar 12, and conversely when the ring is turned to the left the cam projections are so positioned that the rear ends of the hooks may be manually depressed with a resultant lifting of the forward ends of the hooks out of engagement from the collar. The ring is furthermore provided on its advance face with a series of three cam projections 23 which bear respectively upon the rear edges of the lugs 15, and in the lugs are formed slots which permit of the pivot pins 17 of the clutch hooks sliding back and forth and carrying the clutch hooks with them. Upon rotation of the ring to the right the cam projections 23 ride upon the rear edges of the lugs 15 with a resultant bodily movement rearwardly of the ring on the member 11 and resultant bodily carrying rearwardly of the clutch hooks 16 so that the contact beveled faces 18 and 13 of the members are forced into snug engagement with each other and a tight joint assured. Upon rotation of the ring to the left and simultaneous shoving forwardly of the ring, the hooks will be moved forwardly and their disengagement from the stepped collars promoted.

From the above description it will be seen that I have provided an extremely simple and durable hose coupling in which the members may be easily and quickly coupled or uncoupled by the simple manipulation of a single cam ring. It is to be understood that the cam ring may be equipped with wrench engaging projections on the rear face to facilitate the application of a wrench to the ring for rotating the same if necessary, without departing from the spirit or sacrificing any of the advantages of the invention.

What is claimed, is:—

A hose coupling including mating tubular members, a collar on one of the members, a series of hinged lugs on the other member, a series of clutches pivoted intermediate the ends on said hinged lugs each in the form of a bar having a hook on one end engageable with said collar and having a hook on the opposite end forming a counterbalancing weight, the pivotal connection of said clutches with said hinged lugs permitting of longitudinal sliding movement of said clutches relatively to said members, and a revoluble cam ring having peripheral cam projections and facial cam projections both bearing within the inclosure of the weighted hook of each clutch, said cam ring being confined on one of said members and bearing against said hinged lugs and an abutment collar carried by the member in rear of said hinged lugs.

In testimony whereof, I affix my signature, in presence of two witnesses.

WILLIAM E. SANDERS.

Witnesses:
 RICHARD GREEN,
 CHRISTOPHER MULDOON.

Copies of this patent may be obtained for five cents each, by addressing the "Commissioner of Patents, Washington, D. C."